(12) United States Patent
Yoshimura et al.

(10) Patent No.: US 6,696,200 B1
(45) Date of Patent: Feb. 24, 2004

(54) LITHIUM BATTERY WITH BORON-CONTAINING ELECTRODE

(75) Inventors: Seiji Yoshimura, Hirakata (JP); Taeko Ota, Osaka (JP); Shin Fujitani, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 58 days.

(21) Appl. No.: 09/628,408

(22) Filed: Aug. 1, 2000

(30) Foreign Application Priority Data

Aug. 4, 1999 (JP) .............................. 11-221689

(51) Int. Cl.[7] .................. H01M 4/26; H01M 4/48; H01M 10/08
(52) U.S. Cl. .................. 429/231.1; 429/199; 429/323
(58) Field of Search ................. 429/231.1, 224; 29/623.1

(56) References Cited

U.S. PATENT DOCUMENTS

| 5,294,499 | A | * | 3/1994 | Furukawa | 429/164 |
| 5,578,395 | A | * | 11/1996 | Yoshimura | 429/197 |
| 5,807,646 | A | * | 9/1998 | Iwata | 429/224 |
| 6,291,101 | B1 | * | 9/2001 | Kita | 420/231.1 |
| 6,461,770 | B1 | * | 10/2002 | Yoshimura | 429/231.95 |
| 6,509,120 | B1 | * | 1/2003 | Yoshimura | 429/231.95 |

FOREIGN PATENT DOCUMENTS

| JP | 63-114064 | | 5/1988 | |
| JP | 1-235158 | | 9/1989 | |
| JP | 4-237970 | | 8/1992 | |
| JP | 08195200 | * | 7/1996 | ........... H01M/4/02 |
| JP | 9-265984 | | 10/1997 | |

\* cited by examiner

Primary Examiner—Mark Ruthkosky
(74) Attorney, Agent, or Firm—Westerman, Hattori, Daniels & Adrian, LLP

(57) ABSTRACT

A lithium battery comprising a positive electrode, a negative electrode, and a nonaqueous electrolyte containing a lithium trifluoromethanesulfonimide solute and a solvent, wherein the positive electrode comprises a positive-electrode active material of boron-containing lithium-manganese complex oxide with a specific surface area of 12 to 45 $m^2/g$.

11 Claims, 1 Drawing Sheet

LITHIUM BATTERY WITH BORON-CONTAINING ELECTRODE

BACKGROUND OF THE INVENTION

1. Field of the Invention

The present invention relates to a lithium battery comprising a positive electrode, a negative electrode, and a nonaqueous electrolyte containing a solute and a solvent, and more particularly, to a lithium battery improved in charge/discharge cycle performance through suppression of reaction between a positive-electrode active material of the positive electrode and the nonaqueous electrolyte.

2. Description of the Related Art

Recently, rechargeable batteries have found applications in various fields such as electronics. As a novel battery of high power and high energy density, in particular, lithium batteries featuring high electromotive force derived from oxidation/reduction of lithium in the nonaqueous electrolyte have come into wide use.

Such lithium batteries have conventionally employed various metal oxides capable of absorbing and desorbing lithium ions as the positive-electrode active material for use in the positive electrode. More recently, studies have been made on the use of manganese oxides, such as manganese dioxide, as the positive-electrode active material of the lithium battery because manganese oxides generally provide high discharge potentials and are inexpensive.

Unfortunately, in charge/discharge processes of the lithium battery including the positive-electrode active material of manganese oxide, the manganese oxide is repeatedly expanded and contracted so that the crystal structure thereof is destroyed. As a result, the battery suffers a degraded charge/discharge cycle performance.

In recent attempts to improve the charge/discharge cycle performance of the lithium battery including the positive-electrode active material of manganese oxide, a variety of positive-electrode active materials have been proposed. For instance, Japanese Unexamined Patent Publication No. 63-114064(1988) discloses a positive-electrode active material comprising a lithium-manganese complex oxide obtained from manganese dioxide and $Li_2MnO_3$. Japanese Unexamined Patent Publication No. 1-235158 (1989) provides a positive-electrode active material comprising a complex oxide of lithium-containing manganese dioxide wherein lithium is incorporated in the crystal lattice of manganese dioxide. Further, Japanese Unexamined Patent Publication Nos. 4-237970(1992) and 9-265984(1997) disclose positive-electrode active materials comprising lithium-manganese complex oxides added with boron.

SUMMARY OF THE INVENTION

The invention is directed to a lithium battery comprising a positive electrode, a negative electrode, and a nonaqueous electrolyte containing a solute and a solvent, the battery adapted to suppress the reaction between a positive-electrode active material of the positive electrode and the nonaqueous electrolyte for achieving an excellent charge/discharge cycle performance.

A lithium battery according to the invention comprises a positive electrode, a negative electrode, and a nonaqueous electrolyte containing a solute and a solvent, wherein the positive electrode comprises a positive-electrode active material of boron-containing lithium-manganese complex oxide prepared using manganese dioxide with a specific surface area of 15 to 50 $m^2/g$.

According to the inventive lithium battery wherein the positive electrode comprises the positive-electrode active material of boron-containing lithium-manganese complex oxide prepared using manganese dioxide with the specific surface area of 15 to 50 $m^2/g$, boron in the positive-electrode active material suppresses the reaction between the lithium-manganese complex oxide and the nonaqueous electrolyte during charging. Besides, the boron-containing lithium-manganese complex oxide has the specific surface area in such a suitable range as to obviate a problem that the boron-containing lithium-manganese complex oxide has too great a specific surface area or too great a contact area with the nonaqueous electrolyte, tending to react with the nonaqueous electrolyte. Thus, the reaction between the positive-electrode active material and the nonaqueous electrolyte is more positively suppressed. As a result, the positive-electrode active material is prevented from being dissolved in the nonaqueous electrolyte, so that increase in the internal pressure of the lithium battery is suppressed. Hence, the battery is improved in the charge/discharge cycle performance.

If the boron-containing lithium-manganese complex oxide as the positive-electrode active material has a specific surface area of less than 12 $m^2/g$, the current density during the charge/discharge process increases thereby to increase polarization of the positive electrode. This results in an increased possibility of side reaction wherein the nonaqueous electrolyte is decomposed. If the boron-containing lithium-manganese complex oxide as the positive-electrode active material has a specific surface area in excess of 45 $m^2/g$, the positive-electrode active material is increased in contact area with the nonaqueous electrolyte, thus becoming more prone to react with the nonaqueous electrolyte. Therefore, the positive-electrode active material of boron-containing lithium-manganese complex oxide may preferably have a specific surface area in the range of 12 to 45 $m^2/g$. Such a boron-containing lithium-manganese complex oxide more positively suppresses the increase in the internal pressure of the lithium battery, thereby even further improving the charge/discharge cycle performance of the lithium battery.

For more positive suppression of the reaction between the positive-electrode active material and the nonaqueous electrolyte during charging, the solute in the nonaqueous electrolyte of the inventive battery may preferably include at least one substance selected from the group consisting of lithium trifluoromethanesulfonimide, lithium pentafluoroethanesulfonimide, lithium trifluoromethanesulfonmethide, lithium trifluoromethanesulfonate and lithium hexafluorophosphate. More preferably, the solute may include at least one substance selected from the group consisting of lithium trifluoromethanesulfonate and lithium trifluoromethanesulfonimide.

According to the inventive lithium battery, known solvents generally used in the art may be employed as the solvent for the nonaqueous electrolyte. However, for particular purposes of suppressing the reaction between the nonaqueous electrolyte and the positive-electrode active material as well as of increasing the ionic conductivity of the nonaqueous electrolyte, it is preferred to use a solvent mixture containing at least one organic solvent selected from the group consisting of ethylene carbonate, propylene carbonate, butylene carbonate, vinylene carbonate, γ-butyrolactone and sulfolane, and at least one organic solvent selected from the group consisting of 1,2-dimethoxyethane, 1,2-diethoxyethane, 1,2- ethoxymethoxyethane, tetrahydrofuran, dioxolane, dimethyl carbonate, diethyl carbonate and ethylmethyl carbonate. More preferred is a solvent mixture containing at least one organic solvent selected from the group of propylene carbonate and ethylene carbonate, and 1,2-dimethoxyethane.

For proper suppression of the reaction between the positive-electrode active material and the nonaqueous electrolyte during charging, the solvent mixture may preferably contain the two types of organic solvents in respective concentrations of not less than 10 vol%.

According to the inventive lithium battery, the boron-containing lithium-manganese complex oxide as the positive-electrode active material may be obtained by heat-treating a mixture of a boron compound, a lithium compound and manganese dioxide in the presence of oxygen, the mixture containing boron, lithium and manganese in an atomic ratio (B:Li:Mn) of 0.01–0.20:0.2–2.0:1.

Such a composition offers lithium-manganese complex oxide crystals incorporating therein boron or boron compound in a boron-to-manganese atomic ratio (B/Mn) in the range of 0.01 to 0.20.

If the lithium-manganese complex oxide crystals incorporate therein boron or boron compound in an atomic ratio (B/Mn) of 0.01 to 0.20, boron in the positive-electrode active material contributes an adequate suppression of the reaction between the lithium-manganese complex oxide and the nonaqueous electrolyte during charging. Besides, such a positive-electrode active material obviates a problem that boron uninvolved in the charge/discharge process accounts for too great a portion to form a proper solid solution with the lithium-manganese complex oxide whereby the positive-electrode active material suffers an instable crystal structure. As a result, the lithium battery is improved in the charge/discharge cycle performance with the suppressed reaction of the positive-electrode active material with the nonaqueous electrolyte.

In the preparation of the boron-containing lithium-manganese complex oxide, examples of a usable boron compound include boron oxide $B_2O_3$, boric acid $H_3BO_3$, metaboric acid $HBO_2$, lithium metaborate $LiBO_2$, quaternary lithium borate $Li_2B_4O_7$ and the like. Examples of a usable lithium compound include lithium hydroxide LiOH, lithium carbonate $Li_2CO_3$, lithium oxide $Li_2O$, lithium nitrate $LiNO_3$ and the like. Examples of a usable manganese compound include manganese dioxide $MnO_2$, manganese oxyhydroxide MnOOH and the like.

In the heat-treatment of the boron compound, lithium compound and manganese dioxide for producing the positive-electrode active material, temperatures below 150° C. will result in insufficient incorporation of boron or boron compound into the lithium-manganese complex oxide solid and also in insufficient removal of water of crystallization of manganese dioxide. The residual water of crystallization reacts with lithium so as to degrade storability of the lithium battery. On the other hand, heat-treatment temperatures in excess of 430° C. will result in decomposed manganese dioxide so that the resultant complex oxide presents an insufficient mean manganese valence. This leads to the instable crystal structure of the positive-electrode active material, which, in turn, tends to react with the nonaqueous electrolyte, degrading the charge/discharge cycle performance of the lithium battery. Therefore, the boron compound, lithium compound and manganese compound may be heat-treated at temperatures of 150° C. to 430° C., preferably of 250° C. to 430° C., or more preferably of 300° C. to 430° C.

If the boron compound, lithium compound and manganese compound are heat-treated in such a manner, boron or the boron compound form a proper solid solution with the lithium-manganese complex oxide without altering the crystal structure thereof. Thus is maintained the crystal structure combining $Li_2MnO_3$ and $MnO_2$ and featuring an excellent charge/discharge cycle performance.

In the inventive lithium battery, examples of a usable negative-electrode active material of the negative electrode include lithium metals generally used in the art; lithium alloys such as lithium-aluminum alloy, lithium-lead alloy, lithium-tin alloy and the like; and carbon materials capable of absorbing and desorbing lithium ions such as graphite, coke and the like. Where the negative-electrode active material is a lithium-aluminum alloy, in particular, the nonaqueous electrolyte forms an ion conductive film over a surface of the negative-electrode active material. The film serves to suppress the reaction of the negative-electrode active material with the nonaqueous electrolyte, thereby further improving the charge/discharge cycle performance of the lithium battery.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Figure 1:
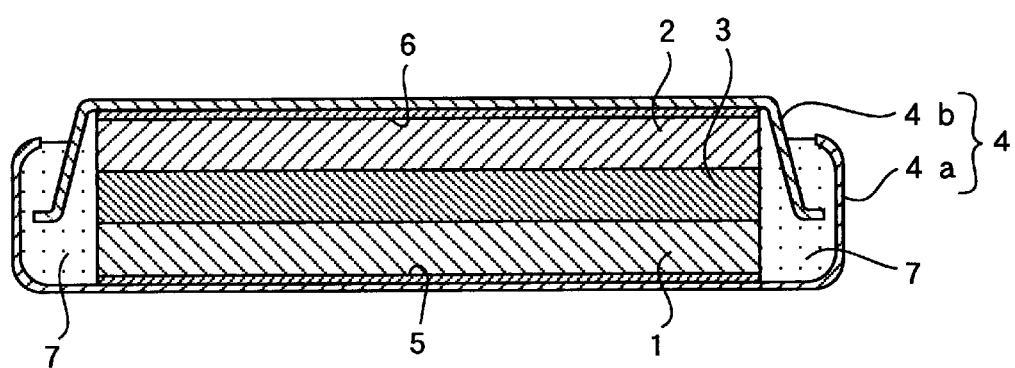
FIG. 1 is a sectional view explanatory of an internal construction of a lithium battery fabricated in inventive examples and comparative examples.

Now, the lithium battery according to the invention will be described in detail by way of specific examples thereof while comparative examples will be cited to demonstrate that the examples of the inventive lithium battery are improved in the charge/discharge cycle performance. It is to be noted that the lithium battery of the invention is not limited to the following examples and suitable modifications may be made thereto within the scope of the invention.

EXAMPLE 1

In Example 1, a positive electrode 1 and a negative electrode 2 were fabricated in the following manners while a nonaqueous electrolyte was prepared as follows. Then, a flat coin-type lithium battery was fabricated as shown in FIG. 1.

Fabrication of Positive Electrode

The positive electrode was fabricated as follows. First, there was prepared a mixture of lithium hydroxide LiOH, boron oxide $B_2O_3$ and manganese dioxide $MnO_2$ having a specific surface area of 20 $m^2/g$, the mixture containing lithium, boron and manganese in an atomic ratio (Li:B:Mn) of 0.55:0.10:1. The resultant mixture was subjected to 20-hour heat-treatment at 375° C. in the atmosphere. The mixture was then ground to give a powdery positive-electrode active material of boron-containing lithium-manganese complex oxide.

The boron-containing lithium-manganese complex oxide was subjected to X-ray diffraction analysis. The X-ray diffraction pattern showed a peak of $Li_2MnO_3$ and a peak of $MnO_2$ which was slightly shifted to the lower angle side from the inherent peak position. It is believed that because of lithium incorporated into the $MnO_2$ solid, the $MnO_2$ peak was shifted to the lower angle side in the X-ray diffraction pattern.

Next, the powdery boron-containing lithium-manganese complex oxide, as the positive-electrode active material, a powdery carbon black as a conductive agent, and a powdery polytetrafluoroethylene as a binder were blended together in a weight ratio of 85:10:5. The resultant positive-electrode active mixture was cast into disc which was dried in vacuum at 250° C. for two hours. Thus was obtained the positive electrode.

Fabrication of Negative Electrode

The negative electrode was prepared by punching out a disc from a lithium-aluminum alloy sheet electrochemically produced.

Preparation of Nonaqueous Electrolyte

The nonaqueous electrolyte was prepared as follows. A solvent mixture was prepared by blending propylene carbonate (PC) and 1,2-dimethoxyethane (DME) in a volume ratio of 1:1. Then, lithium trifluoromethanesulfonimide LiN$(CF_3SO_2)_2$, as a solute, was dissolved in the resultant solvent mixture in a concentration of 1 mol/l.

Fabrication of Battery

A flat coin-type lithium battery having a diameter of 24 mm and a thickness of 3 mm was fabricated in the following manner. A separator 3 was prepared by immersing a polypropylene porous film in the above nonaqueous electrolyte. As shown in FIG. 1, the separator 3 was sandwiched between the positive electrode 1 and negative electrode 2 and placed in a battery case 4 consisting of a positive electrode can 4a and a negative electrode can 4b. The positive electrode 1 was connected to the positive electrode can 4a via a positive electrode collector 5 formed of a stainless sheet (SUS316) whereas the negative electrode 2 was connected to the negative electrode can 4b via a negative electrode collector 6 formed of a stainless sheet (SUS304). The positive electrode can 4a and negative electrode can 4b were electrically isolated from each other by means of a polypropylene insulation packing 7. A precharge internal resistance of the lithium battery was determined to be about 10 Ω.

EXAMPLES 2 to 6

Examples 2 to 6 were different from Example 1 in that positive-electrode active materials of boron-containing lithium-manganese complex oxides were prepared using manganese dioxides with different specific surface areas. As shown in Table 1 below, Example 2 used manganese dioxide with a specific surface area of 15 $m^2/g$; Example 3 used manganese dioxide with a specific surface area of 25 $m^2/g$; Example 4 used manganese dioxide with a specific surface area of 30 $m^2/g$; Example 5 used manganese dioxide with a specific surface area of 40 $m^2/g$; and Example 6 used manganese dioxide with a specific surface area of 50 $m^2/g$. Except for this, the same procedure as in Example 1 was taken to fabricate the respective positive electrodes. Table 1 also lists respective specific surface areas of the resultant boron-containing lithium-manganese complex oxides: 12 $m^2/g$ in Example 2; 22 $m^2/g$ in Example 3; 15 $m^2/g$ in Example 4; 36 $m^2/g$ in Example 5; and 45 $m^2/g$ in Example 6.

Using the resultant positive electrodes, lithium batteries of Examples 2 to 6 were fabricated the same way as in Example 1.

COMPARATIVE EXAMPLES 1, 2

Comparative Examples 1, 2 were different from Example 1 in that positive-electrode active materials of boron-containing lithium-manganese complex oxides were prepared using manganese dioxides with different specific surface areas. As shown in Table 1 below, Comparative Example 1 used manganese dioxide with a specific surface area of 10 $m^2/g$; and Comparative Example 2 used manganese dioxide with a specific surface area of 60 $m^2/g$. Except for this, the same procedure as in Example 1 was taken to fabricate the respective positive electrodes. Table 1 also lists respective specific surface areas of the resultant boron-containing lithium-manganese complex oxides: 8 $m^2/g$ in Comparative Example 1; and 55 $m^2/g$ in Comparative Example 2.

Using the resultant positive electrodes, lithium batteries of Comparative Examples 1, 2 were fabricated the same way as in Example 1.

The lithium batteries of Examples 1 to 6 and Comparative Example 1, 2 were each charged and discharged in cycles, each cycle consisting of charging at 10 mA charge current to a charge end voltage of 3.2 V followed by discharging at 10 mA discharge current to a discharge end voltage of 2.0 V. Each battery was determined for the initial discharge capacity at cycle 1 as well as the number of cycles before a discharge capacity decline to less than half the initial discharge capacity. The results are listed in Table 1 as below.

TABLE 1

| | specific surface area ($m^2/g$) | | |
|---|---|---|---|
| | $MnO_2$ | boron-containing lithium-manganese complex oxide | number of cycles |
| example 1 | 20 | 18 | 65 |
| example 2 | 15 | 12 | 60 |
| example 3 | 25 | 22 | 64 |
| example 4 | 30 | 25 | 62 |
| example 5 | 40 | 36 | 61 |
| example 6 | 50 | 45 | 60 |
| comparative example 1 | 10 | 8 | 50 |
| comparative example 2 | 60 | 55 | 48 |

As apparent from the results, the manganese dioxides with the specific surface areas of 15 to 50 $m^2/g$ gave the boron-containing lithium-manganese complex oxides with the specific surface areas in the range of 12 to 45 $m^2/g$. On the other hand, the manganese dioxide with the specific surface area of 10 $m^2/g$ gave the boron-containing lithium-manganese complex oxide with a smaller specific surface area of 8 $m^2/g$, as compared to the above. The manganese dioxide with the specific surface area of 60 $m^2/g$ gave the boron-containing lithium-manganese complex oxide with a greater specific surface area of 55 $m^2/g$, as compared to the above.

The lithium batteries of Examples 1 to 6 employing the positive-electrode active material of boron-containing lithium-manganese complex oxide with the specific surface area of 12 to 45 $m^2/g$ have attained greater improvement in the charge/discharge cycle performance with notable increase in the number of cycles before the decline to less than half the initial discharge capacity, as compared to that of Comparative Example 1 employing the boron-containing lithium-manganese complex oxide with the smaller specific surface area of 8 m²/g, and that of Comparative Example 2 employing the boron-containing lithium-manganese complex oxide with the greater specific surface area of 55 m²/g.

EXAMPLES 7 to 10

Examples 7 to 10 were different from Example 1 in that positive-electrode active materials of boron-containing lithium-manganese complex oxides were prepared using ingredient mixtures containing lithium hydroxide LiOH, boron oxide $B_2O_3$ and manganese dioxide $MnO_2$ with a specific surface area of 20 m²/g in varied mixing ratios. As shown in Table 2 below, Example 7 used a mixture containing lithium, boron and manganese in an atomic ratio (Li:B:Mn) of 0.505:0.01:1; Example 8 used a mixture with an atomic ratio (Li:B:Mn) of 0.51:0.02:1; Example 9 used a mixture with an atomic ratio (Li:B:Mn) of 0.53:0.06:1; and Example 10 used a mixture with an atomic ratio (Li:B:Mn) of 0.60:0.02:1. Except for this, the same procedure as in Example 1 was taken to fabricate the respective positive electrodes. All the resultant boron-containing lithium-manganese complex oxides presented the same specific surface area of 18 m²/g as in Example 1.

Using the resultant positive electrodes, lithium batteries of Examples 7 to 10 were fabricated the same way as in Example 1.

COMPARATIVE EXAMPLE 3

Comparative Example 3 took the same procedure as in Example 1 to fabricate a positive electrode except that a positive-electrode active material was prepared using a mixture containing lithium hydroxide LiOH and manganese dioxide $MnO_2$ with a specific surface area of 20 m²/g in a lithium-to-manganese atomic ratio (Li:Mn) of 0.50:1, thus dispensing with a boron compound.

Using the resultant positive electrode, a lithium battery of Comparative Example 3 was fabricated the same way as in Example 1.

Similarly to Examples 1 to 6 and Comparative Examples 1, 2, the batteries of Examples 7 to 10 and Comparative Example 3 were each determined for the number of cycles before the decline to less than half the initial discharge capacity. The results, along with that of Example 1, are listed in Table 2 as below.

TABLE 2

| | atomic ratio | | | number of |
|---|---|---|---|---|
| | Li | B | Mn | cycles |
| example 7 | 0.505 | 0.01 | 1 | 60 |
| example 8 | 0.51 | 0.02 | 1 | 62 |
| example 9 | 0.53 | 0.06 | 1 | 64 |
| example 1 | 0.55 | 0.10 | 1 | 65 |
| example 10 | 0.60 | 0.20 | 1 | 60 |
| comparative example 3 | 0.50 | 0 | 1 | 21 |

As apparent from the results, the lithium batteries of Examples 1, 7 to 10 have attained greater improvement in the charge/discharge cycle performance with notable increase in the number of cycles before the decline to less than half the initial discharge capacity, as compared to that of Comparative Example 3. Examples 1, 7 to 10 employed the positive-electrode active material of boron-containing lithium-manganese complex oxide which was prepared using manganese dioxide $MnO_2$ with the specific surface area of 20 m²/g and had the specific surface area of 18 m²/g and the boron-to-manganese atomic ratio (B/Mn) of 0.01 to 0.20, whereas Comparative Example 3 employed the boron-free lithium-manganese complex oxide as the positive-electrode active material.

EXAMPLES 11 to 14

These examples were different from Example 1 only in the type of solute for the nonaqueous electrolyte. As shown in Table 3 below, Example 11 used lithium pentafluoroethanesulfonimide $LiN(C_2F_5SO_2)_2$; Example 12 used lithium trifluoromethanesulfonmethide $LiC(CF_3SO_2)_3$; Example 13 used lithium trifluoromethanesulfonate $LiCF_3SO_3$; and Example 14 used lithium hexafluorophosphate $LiPF_6$. Nonaqueous electrolytes of these examples were prepared using such solutes. Except for this, the same procedure as in Example 1 was taken to fabricate the respective lithium batteries.

Similarly to Examples 1 to 6 and Comparative Examples 1, 2, the batteries of Examples 11 to 14 were each determined for the number of cycles before the decline to less than half the initial discharge capacity. The results, along with that of Example 1, are listed in Table 3 as below.

TABLE 3

| | solute in nonaqueous electrolyte | number of cycles |
|---|---|---|
| example 1 | $LiN(CF_3SO_2)_2$ | 65 |
| example 11 | $LiN(C_2F_5SO_2)_2$ | 60 |
| example 12 | $LiC(CF_3SO_2)_3$ | 62 |
| example 13 | $LiCF_3SO_3$ | 64 |
| example 14 | $LiPF_6$ | 60 |

As to the case where the positive-electrode active material is the boron-containing lithium-manganese complex oxide prepared using manganese dioxide with the specific surface area of 20 m²/g, the results show that the lithium batteries of Examples 11 to 14, like that of Example 1, have attained greater improvement in the charge/discharge cycle performance with notable increase in the number of cycles before the decline to less than half the initial discharge capacity, as compared to those of Comparative Examples 1 to 3. Example 1 employed $LiN(CF_3SO_2)_2$ as the solute for the nonaqueous electrolyte, whereas Examples 11 to 14 respectively employed $LiN(C_2F_5SO_2)_2$, $LiC(CF_3SO_2)_3$, $LiCF_3SO_3$ and $LiPF_6$, as the solute. Particularly excellent charge/discharge cycle performances are achieved by the batteries of Example 1 and 13 employing $LiN(CF_3SO_2)_2$ and $LiCF_3SO_3$ as the solute for the nonaqueous electrolyte, respectively.

EXAMPLES 15 to 26

Examples 15 to 26 were different from Example 1 only in the type of solvent for the nonaqueous electrolyte. As shown in Table 4 below, Example 15 used a solvent mixture of ethylene carbonate (EC) and 1,2-dimethoxyethane (DME); Example 16 used a solvent mixture of butylene carbonate (BC) and 1,2-dimethoxyethane (DME); Example 17 used a solvent mixture of vinylene carbonate (VC) and 1,2-dimethoxyethane (DME); Example 18 used a solvent mixture of γ-butyrolactone (γ-BL) and 1,2-dimethoxyethane (DME); Example 19 used a solvent mixture of sulfolane (SL) and 1,2-dimethoxyethane (DME); Example 20 used a solvent mixture of propylene carbonate (PC) and 1,2-diethoxyethane (DEE); Example 21 used a solvent mixture of propylene carbonate (PC) and 1,2-ethoxymethoxyethane (EME); Example 22 used a solvent mixture of propylene carbonate (PC) and tetrahydrofuran (THF); Example 23 used a solvent mixture of propylene carbonate (PC) and dioxolane (DOXL); Example 24 used a solvent mixture of propylene carbonate (PC) and dimethyl carbonate (DMC); Example 25 used a solvent mixture of propylene carbonate (PC) and diethyl carbonate (DEC); and Example 26 used a solvent mixture of propylene carbonate (PC) and ethylmethyl carbonate (EMC). In the respective examples, the nonaqueous electrolyte was prepared using the solvent mixture containing the solvents in a volume ratio of 1:1.

Using the resultant nonaqueous electrolytes, batteries of Examples 15 to 26 were fabricated the same way as in Example 1.

Similarly to Examples 1 to 7 and Comparative Examples 1 to 3, the batteries of Examples 15 to 26 were each determined for the number of cycles before the decline to less than half the initial discharge capacity. The results, along with that of Example 1, are listed in Table 4 as below.

TABLE 4

| | solvent in nonaqueous electrolyte (vol ratio) | number of cycles |
|---|---|---|
| example 1 | PC:DME (1:1) | 65 |
| example 15 | EC:DME (1:1) | 64 |
| example 16 | BC:DME (1:1) | 60 |
| example 17 | VC:DME (1:1) | 61 |
| example 18 | γ-BL:DME (1:1) | 61 |
| example 19 | SL:DME (1:1) | 61 |
| example 20 | PC:DEE (1:1) | 63 |
| example 21 | PC:EME (1:1) | 60 |
| example 22 | PC:THF (1:1) | 61 |
| example 23 | PC:DOXL (1:1) | 62 |
| example 24 | PC:DMC (1:1) | 60 |
| example 25 | PC:DEC (1:1) | 61 |
| example 26 | PC:EMC (1:1) | 63 |

As to the case where the positive-electrode active material is the boron-containing lithium-manganese complex oxide with the specific surface area of 18 $m^2/g$ which is prepared using manganese dioxide $MnO_2$ with the specific surface area of 20 $m^2/g$, the results show that the lithium batteries of Examples 15 to 26, like that of Example 1, have attained greater improvement in the charge/discharge cycle performance with notable increase in the number of cycles before the decline to less than half the initial discharge capacity, as compared to those of Comparative Examples 1 to 3. Examples 15 to 26 used the solvent mixture for nonaqueous electrolyte which contained at least one organic solvent selected from the group consisting of ethylene carbonate, propylene carbonate, butylene carbonate, vinylene carbonate, γ-butyrolactone and sulfolane and at least one organic solvent selected from the group consisting of 1,2-dimethoxyethane, 1,2-diethoxyethane, 1,2-ethoxymethoxyethane, tetrahydrofuran, dioxolane, dimethyl carbonate, diethyl carbonate and ethylmethyl carbonate. Particularly excellent charge/discharge cycle performances are achieved by Examples 1 and 15 using the solvent mixture of propylene carbonate and 1,2-dimethoxyethane, and of ethylene carbonate and 1,2-dimethoxyethane, respectively.

EXAMPLE 27

In the fabrication of a positive electrode, Example 27 used the same ingredients for positive-electrode active material as in Example 1. That is, lithium hydroxide LiOH, boron oxide $B_2O_3$, and manganese dioxide $MnO_2$ with the specific surface area of 20 $m^2/g$ were blended in the atomic ratio (Li:B:Mn) of 0.55:0.10:1. As shown in Table 5 below, the resultant mixture was heat-treated at 150° C. Except for this, the same procedure as in Example 1 was taken to fabricate the positive electrode. The resultant boron-containing lithium-manganese complex oxide had a specific surface area of 18 $m^2/g$.

Using the positive electrode thus obtained, a lithium battery of Examples 27 was fabricated the same way as in Example 1.

COMPARATIVE EXAMPLE 4

In the fabrication of a positive electrode, Comparative Example 4 prepared a mixture containing lithium carbonate $LiCO_3$, boron oxide $B_2O_3$ and manganese carbonate $MnCO_3$ in an atomic ratio (Li:B:Mn) of 2:0.10:1. As shown in Table 5 below, the resultant mixture was heat-treated at 850° C. Except for this, the same procedure as in Example 1 was taken to fabricate the positive electrode. The resultant boron-containing lithium-manganese complex oxide was a spinel $LiMn_2O_4$ solid solution compound incorporating boron or boron compound and had a specific surface area of 10 $m^2/g$.

Using the positive electrode thus obtained, a lithium battery of Comparative Examples 4 was fabricated the same way as in Example 1.

Similarly to Examples 1 to 3 and Comparative Examples 1 to 5, the batteries of Examples 27 and Comparative Example 4 were each determined for the number of cycles before the decline to less than half the initial discharge capacity. The results, along with that of Example 1, are listed in Table 5 as below.

TABLE 5

| | atomic ratio | | | heat-treatment temperature | specific surface area | number of |
|---|---|---|---|---|---|---|
| | Li | B | Mn | (° C.) | ($m^2/g$) | cycles |
| example 27 | 0.55 | 0.10 | 1 | 250 | 18 | 60 |
| example 1 | 0.55 | 0.10 | 1 | 375 | 18 | 65 |
| comparative example 4 | 2 | 0.10 | 1 | 850 | 10 | 21 |

As apparent from the results, the lithium batteries of Examples 1, 27 have attained greater improvement in the charge/discharge cycle performance with notable increase in the number of cycles before the decline to less than half the initial discharge capacity, as compared to that of Comparative Example 4. Examples 1, 27 employed the positive-electrode active materials of boron-containing lithium-manganese complex oxides with the specific surface area of 18 $m^2/g$ which were individually obtained by heat-treating the ingredient mixture at the respective temperatures of 250° C. and 375° C., the ingredient mixture containing lithium hydroxide LiOH, boron oxide $B_2O_3$ and manganese dioxide $MnO_2$ with the specific surface area of 20 $m^2/g$. On the other hand, Comparative Example 4 employed the positive-electrode active material of boron-containing lithium-manganese complex oxide with the specific surface area of 10 $m^2/g$ which was obtained by heat-treating the ingredient mixture at 850° C., the mixture containing lithium carbonate $LiCO_3$, boron oxide $B_2O_3$ and manganese carbonate $MnCO_3$.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A lithium battery comprising a positive electrode, a negative electrode, and a nonaqueous electrolyte containing a solute and a solvent, wherein said positive electrode comprises a positive-electrode active material of boron-containing lithium-manganese complex oxide prepared using a manganese oxide with a specific surface area in the range of 12 to 45 m$^2$/g m$^2$/g;

and wherein said solute comprises lithium trifluoromethanesulfonimide.

2. The lithium battery of claim 1, wherein said solvent in the nonaqueous electrolyte is a solvent mixture of ethylene carbonate and 1,2-dimethoxyethane or a solvent mixture of propylene carbonate and 1,2-dimethoxyethane.

3. The lithium battery of claim 1, wherein said positive-electrode active material is a boron-containing lithium-manganese complex oxide obtained by heat-treating a mixture of a boron compound, a lithium compound and a manganese oxide in the presence of oxygen, the mixture containing boron, lithium, and manganese in an atomic ratio (B:Li:Mn) of 0.01–0.20:0.1–2.0:1.

4. The lithium battery of claim 3, wherein said heat-treatment is performed at temperatures of 150° C. to 430° C.

5. The lithium battery of claim 3, wherein said heat-treatment is performed at temperatures of 250° C. to 430° C.

6. The lithium battery of claim 3, wherein said heat-treatment is performed at temperatures of 300° C. to 430° C.

7. The lithium battery of claim 3, wherein said boron compound is at least one compound selected from the group consisting of boron oxide $B_2O_3$, boric acid $H_3BO_3$, metaboric acid $HBO_2$, lithium metaborate $LiBO_2$ and quaternary lithium borate $Li_2B_4O_7$.

8. The lithium battery of claim 3, wherein said lithium compound is at least one compound selected from the group consisting of lithium hydroxide LiOH, lithium carbonate $Li_2CO_3$, lithium oxide $Li_2O$ and lithium nitrate $LiNO_3$.

9. The lithium battery of claim 3, wherein said manganese oxide is at least one compound selected from the group consisting of manganese dioxide $MnO_2$ and manganese oxyhydroxide MnOOH.

10. The lithium battery of claim 1, wherein said negative electrode comprises a negative-electrode active material including at least one substance selected from the group consisting of lithium metals, lithium alloys, and carbon materials capable of absorbing and desorbing lithium ions.

11. The lithium battery of claim 1, wherein said negative electrode comprises a negative-electrode active material of an alloy of lithium and aluminum.

* * * * *